United States Patent
Chang et al.

(10) Patent No.: US 10,262,687 B1
(45) Date of Patent: Apr. 16, 2019

(54) DISC GRABBING DEVICE FOR GRABBING A PLURALITY OF DISCS AND SEQUENTIALLY UNLOADING THE PLURALITY OF DISCS

(71) Applicants: LITE-ON ELECTRONICS (GUANGZHOU) LIMITED, Guangzhou (CN); LITE-ON TECHNOLOGY CORPORATION, Taipei (TW)

(72) Inventors: Jung-Fang Chang, Taipei (TW); Cheng-Wen Huang, Taipei (TW); Ming-Chun Tsao, Taipei (TW); Chien-Shou Chen, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 15/959,500

(22) Filed: Apr. 23, 2018

(30) Foreign Application Priority Data

Feb. 26, 2018 (CN) .......................... 2018 1 0159566

(51) Int. Cl.
*F16H 37/06* (2006.01)
*G11B 17/054* (2006.01)

(52) U.S. Cl.
CPC ......... *G11B 17/054* (2013.01); *F16H 37/065* (2013.01)

(58) Field of Classification Search
CPC ... G11B 23/505; G11B 17/225; G11B 17/054; F16H 37/065
See application file for complete search history.

(56) References Cited

U.S. PATENT DOCUMENTS

| | | | | |
|---|---|---|---|---|
| 5,646,926 A * | 7/1997 | Handa | .................. | G11B 17/041 720/636 |
| 6,111,847 A * | 8/2000 | Assadian | ............... | B25J 15/028 294/97 |
| 7,885,148 B2 * | 2/2011 | Ikeda | ..................... | G11B 23/40 369/30.03 |
| 8,578,400 B2 * | 11/2013 | Yamada | ................. | B41J 3/4071 720/615 |
| 9,613,649 B1 * | 4/2017 | Shimoda | .............. | G11B 17/225 |
| 9,761,265 B2 * | 9/2017 | Chihara | ............... | G11B 17/223 |

(Continued)

*Primary Examiner* — Brian E Miller
(74) *Attorney, Agent, or Firm* — McClure, Qualey & Rodack, LLP

(57) ABSTRACT

A disc grabbing device including a support body, a drive shaft, multiple first planetary gears, a center gear, multiple second planetary gears and a driver is provided. The support body includes a plate and a center column. When the disc grabbing device grabs the discs, the center column is located in the center holes of the discs. The drive shaft is rotatably disposed on the plate. The first planetary gears are respectively engaged with the drive shaft and connected to multiple first levers for driving the first levers to rotate. The second planetary gears are respectively engaged with the center gear and connected to multiple second levers for driving the second levers to rotate. The driver concurrently drives the drive shaft and the center gear to rotate the first planetary gears and the second planetary gears synchronically and make the first levers and the second levers rotate synchronically.

8 Claims, 8 Drawing Sheets

(56) References Cited

U.S. PATENT DOCUMENTS

| | | | |
|---|---|---|---|
| 9,799,367 B1* | 10/2017 | Zhu | B25J 15/0028 |
| 10,008,235 B1* | 6/2018 | Chang | G11B 17/08 |
| 2002/0003754 A1* | 1/2002 | Russ | G11B 17/022 |
| | | | 369/30.34 |
| 2003/0002400 A1* | 1/2003 | Klein | G11B 17/08 |
| | | | 369/30.55 |
| 2009/0178066 A1* | 7/2009 | Liu | G11B 17/056 |
| | | | 720/615 |
| 2010/0100895 A1* | 4/2010 | Hernandez | G11B 17/08 |
| | | | 720/703 |
| 2013/0223969 A1* | 8/2013 | Nakano | B65H 3/54 |
| | | | 414/796.9 |
| 2013/0326548 A1* | 12/2013 | Chihara | G11B 17/053 |
| | | | 720/615 |
| 2014/0003899 A1* | 1/2014 | Okamoto | G11B 33/0444 |
| | | | 414/618 |

* cited by examiner

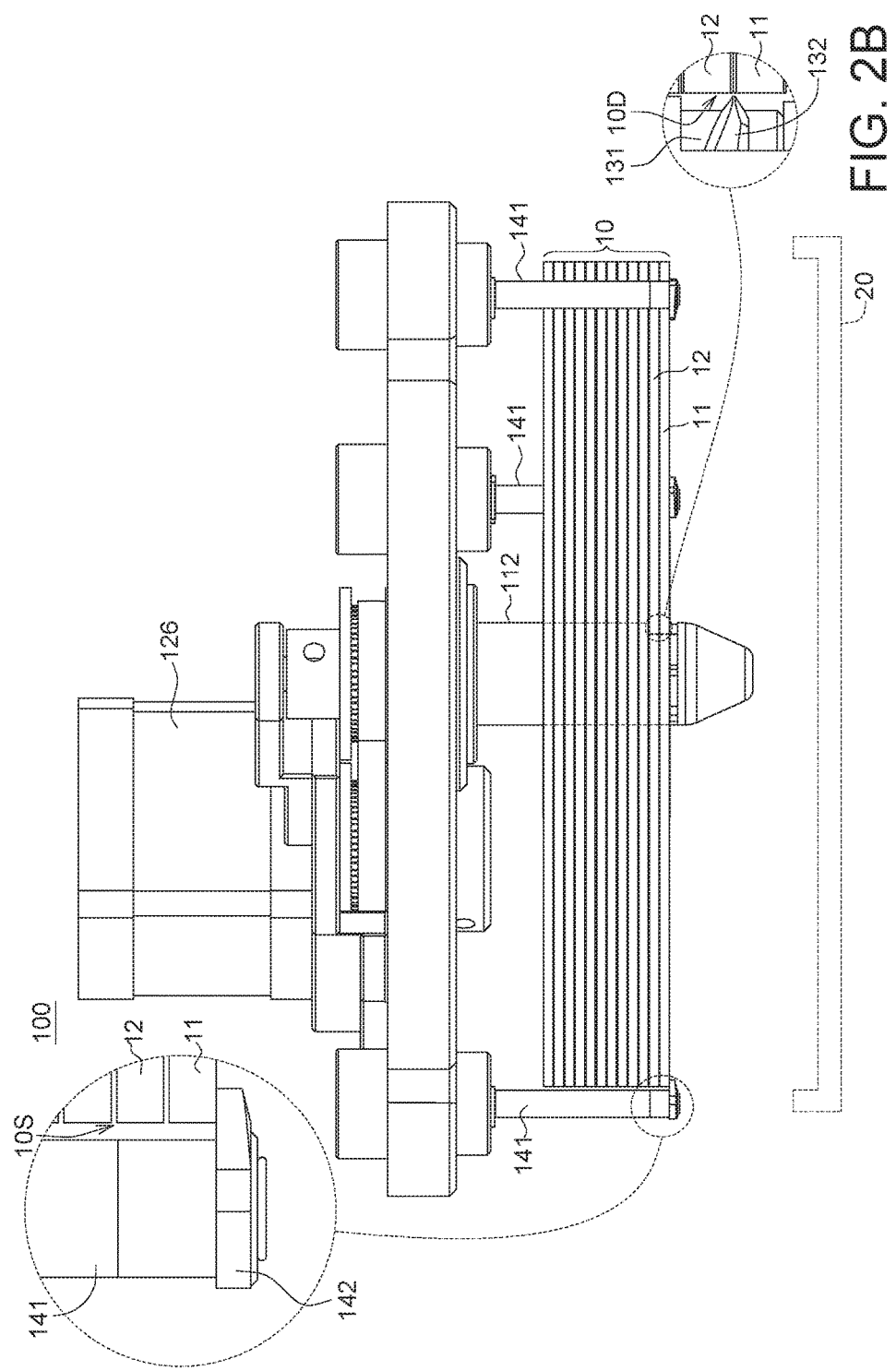

DISC GRABBING DEVICE FOR GRABBING A PLURALITY OF DISCS AND SEQUENTIALLY UNLOADING THE PLURALITY OF DISCS

This application claims the benefit of People's Republic of China application Serial No. 201810159566.7, filed Feb. 26, 2018, the subject matter of which is incorporated herein by reference.

BACKGROUND OF THE INVENTION

Field of the Invention

The invention relates in general to a grabbing device, and more particularly to a disc grabbing device.

Description of the Related Art

The disc archive system, which uses discs as a data storage medium, normally includes multiple disc drives, a disc library for placing multiple discs, and a disc grabbing device. The disc grabbing device is for grabbing and unloading discs, and moving discs between the disc library and the disc drives. For example, the disc grabbing device grabs a disc from the disc library and then moves and unloads the disc to the disc drive, or grabs a disc from the disc drive and then moves and unloads the disc to the disc library. To increase the disc handling efficiency, the disc grabbing device may grab multiple discs and then move and unload the multiple discs at one time. For example, the disc grabbing device may grab multiple discs from the disc library and then moves and unload the multiple discs to their corresponding disc drives respectively. The disc grabbing device may grab discs from respective disc drives and then hold the discs on the disc grabbing device. Then, the disc grabbing device unloads the grabbed discs to the disc library.

Although the disc grabbing device may grab multiple discs and then move and unload the multiple discs at one time, normally one disc drive can only access one single disc. Therefore, how to provide a disc grabbing device capable of unloading each of the grabbed discs to its corresponding disc drive has become a prominent task for people in the technology field of the invention.

SUMMARY OF THE INVENTION

The invention is directed to a disc grabbing device capable of synchronically rotating multiple first levers and multiple second levers through the design of planetary gears and grabbing multiple discs and sequentially unloading the discs through the cooperation of a first lever and a second lever.

According to one embodiment of the present invention, a disc grabbing device is provided for grabbing multiple discs and sequentially unloading the discs. The disc grabbing device includes a support body, a drive shaft, multiple first planetary gears, a center gear, multiple second planetary gears and a driver. The support body includes a plate and a center column. When the disc grabbing device grabs the discs, the center column is located in the center holes of the discs. The drive shaft is rotatably disposed on the plate. The first planetary gears are respectively engaged with the drive shaft and connected to multiple first levers disposed in the center column for driving the first levers to rotate. The center gear is rotatably disposed on the plate. The second planetary gears are respectively engaged with the center gear and connected to multiple second levers for driving the second levers to rotate. The second levers are located outside the discs. The driver is for concurrently driving the drive shaft and the center gear to rotate the first planetary gears and the second planetary gears synchronically and make the first levers and the second levers also rotate synchronically.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIG. 2B is a schematic diagram of a disc grabbing device in a second operating state and a partial enlarged view corresponding to a first lever and a second lever.

DETAILED DESCRIPTION OF THE INVENTION

Detailed descriptions of the invention are disclosed below with a number of embodiments. However, the disclosed embodiments are for explanatory and exemplary purposes only, not for limiting the scope of protection of the invention. Similar/identical designations are used to indicate similar/identical elements.

Figure 1A:
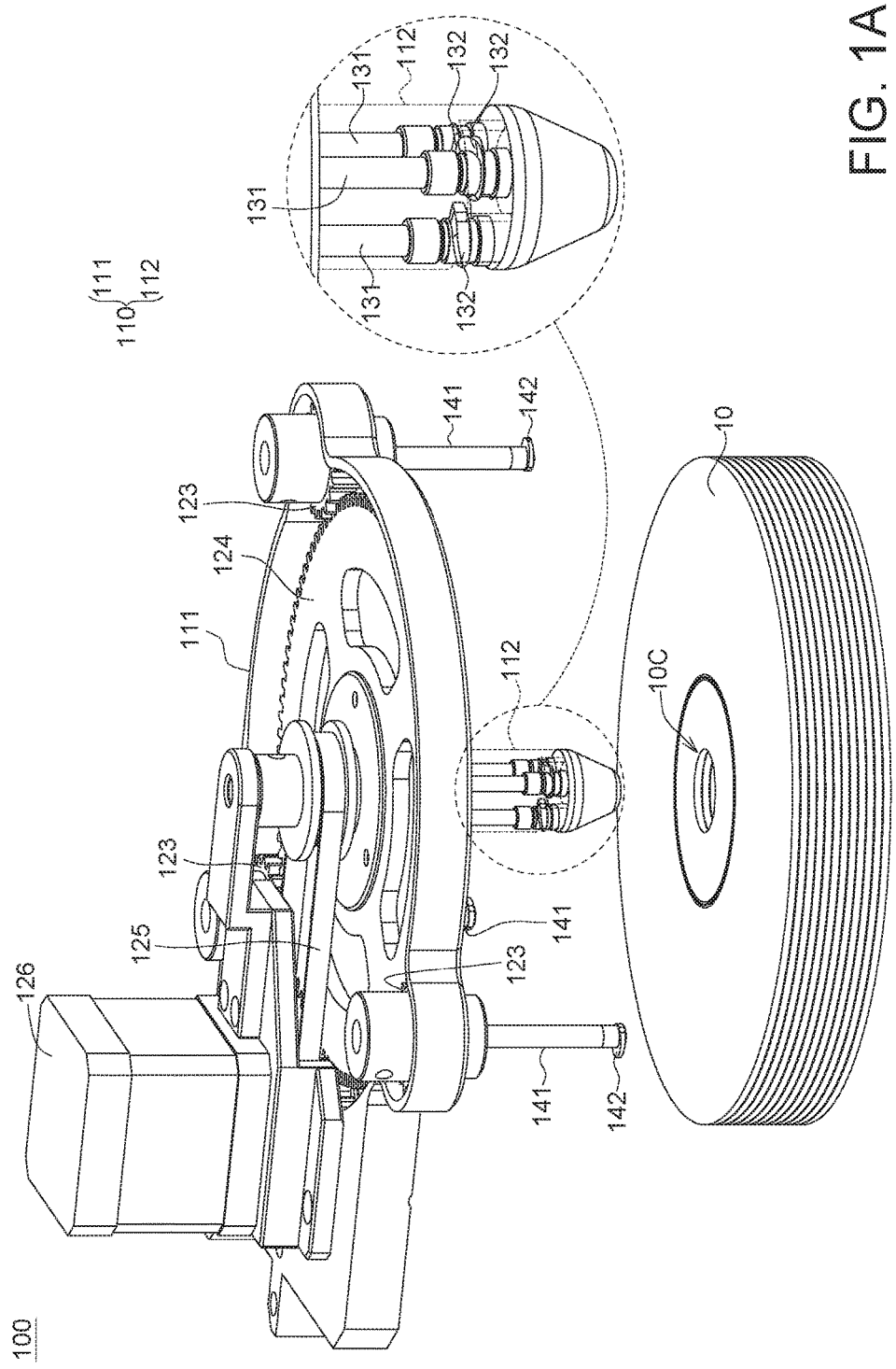
FIG. 1A is an external view of a disc grabbing device and a schematic diagram of the internal structure of a center column according to an embodiment of the present invention.
Figure 1B:
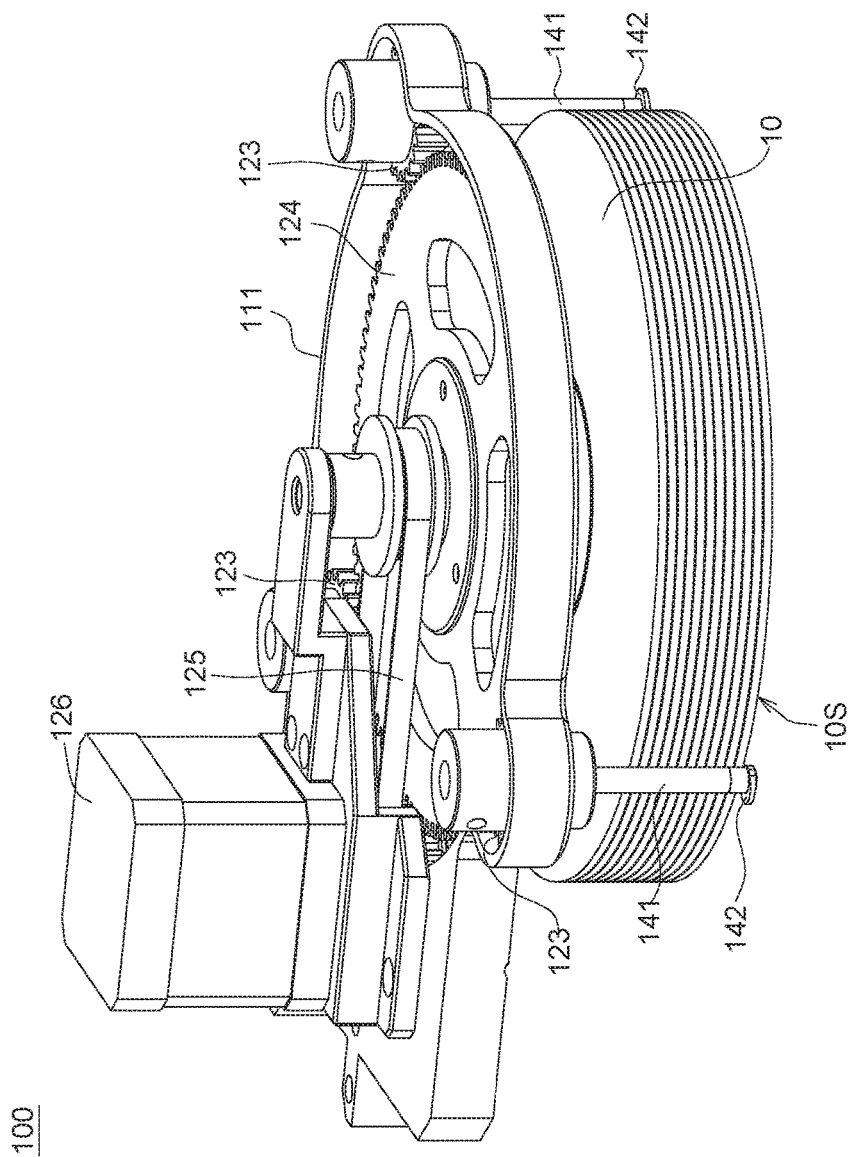
FIG. 1B is an external view of a disc grabbing device when grabbing multiple discs according to an embodiment of the present invention.
Figure 1C:
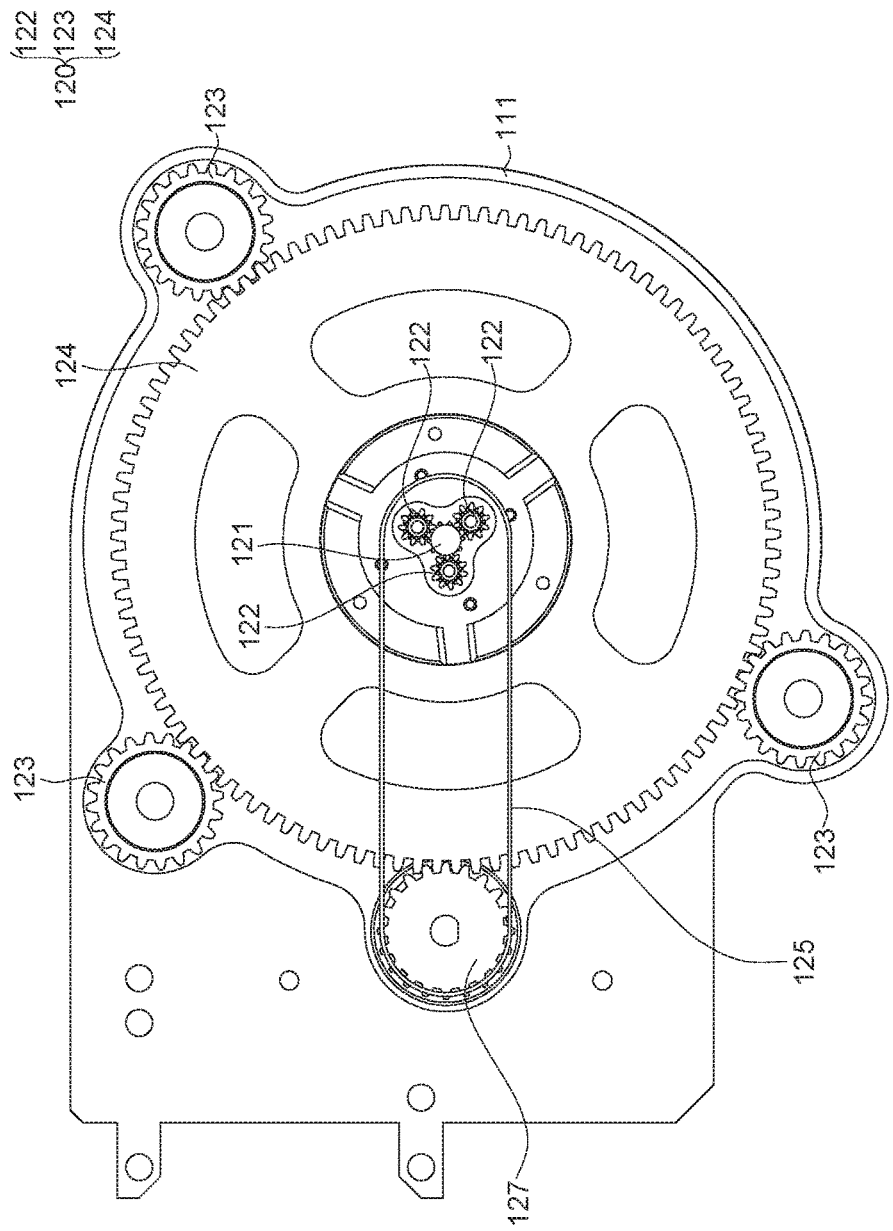
FIG. 1O is a top view of a disc grabbing device according to an embodiment of the present invention.
FIGS. 1D and 1E are respectively an external view of a first lever and an external view of a second lever according to an embodiment of the present invention.
Figure 1D:
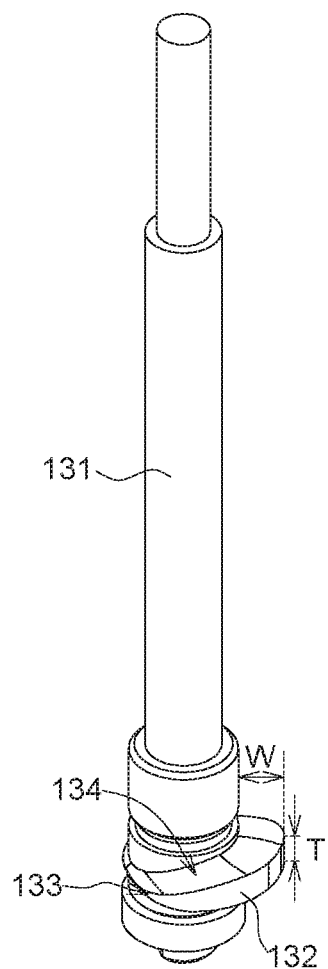
Figure 1E:
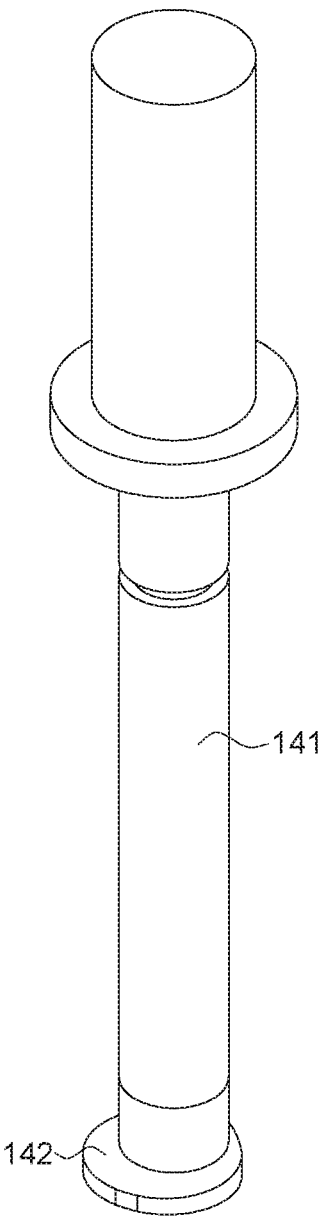

FIG. 1A is an external view of a disc grabbing device 100 and a schematic diagram of the internal structure of a center column 112 according to an embodiment of the present invention. FIG. 1B is an external view of the disc grabbing device 100 after grabbing multiple discs according to an embodiment of the present invention. FIG. 1C is a top view of the disc grabbing device 100 according to an embodiment of the present invention. FIGS. 1D and 1E are respectively an external view of a first lever 131 and an external view of a second lever 141 according to an embodiment of the present invention. FIGS. 2A-2D are schematic diagrams of the disc grabbing device 100 in a first operating state, a second operating state, a third operating state and a fourth operating state respectively and partial enlarged views corresponding to the first lever 131 and the second lever 141.

Refer to FIGS. 1A, 1B and 1C. The disc grabbing device 100 according to an embodiment of the present invention is used for grabbing multiple discs 10 and further sequentially unloading each of the multiple discs 10 to respective one of multiple disc drives. In the present embodiment, the disc grabbing device 100 includes a support body 110, a gear set 120, a drive shaft 121, a driver 126, multiple first levers 131 and multiple second levers 141. The support body 110 includes a plate 111 and a center column 112 (denoted in dotted lines). The drive shaft 121 is rotatably disposed on the plate 111. The gear set 120 is disposed on the plate 111. The gear set 120 and the drive shaft 121 can be driven by the driver 126 (such as a motor) to rotate. The first levers 131 are disposed in the center column 112.

In the present embodiment as indicated in FIGS. 1A and 10, the gear set 120 includes multiple first planetary gears 122, multiple second planetary gears 123 and a center gear 124. The first planetary gears 122 are respectively connected to the first levers 131 disposed in the center column 112 for driving the first levers 131 to rotate. The first planetary gears 122 can be engaged with the drive shaft 121 and can rotate synchronically under driving of the drive shaft 121. Besides, the second planetary gears 123 are respectively connected to the second levers 141 for driving the second levers 141 to rotate. The second planetary gears 123 can be engaged with the center gear 124 disposed on the plate 111 and can rotate synchronically under driving of the center gear 124. The driver 126 can drive the drive shaft 121 and the center gear 124 to rotate and make the first planetary gears 122 and the second planetary gears 123 rotate synchronically, and make the first levers 131 and the second levers 141 also rotate synchronically.

In an embodiment, the driver 126, by using the belt 125 and the active gear 127 engaged with the center gear 124, respectively drives the drive shaft 121 and the center gear 124 to rotate and make the first planetary gears 122 and the second planetary gears 123 rotate synchronically, but the present invention is not limited thereto.

In the present embodiment, the first levers 131 are disposed in the center column 112, and the quantity of the first levers 131 is exemplified by 3. The first levers 131 can rotate as the drive shaft 121 drives the first planetary gears 122 to rotate. Moreover, the second planetary gears 123 are disposed near the periphery of the plate 111, and the second levers 141 are located outside the grabbed discs as indicated in FIG. 1B. The quantity of the second levers 141 is exemplified by 3. The second levers 141 rotate as the center gear 124 drives the second planetary gears 123 to rotate.

Furthermore, the center column 112 can be inserted into the center hole 100 of multiple stacked discs 10, such that the first levers 131 can correspond to the inner edges 10D of the center holes of the stacked discs 10, the second levers 141 can correspond to the outer edges 10S of the discs, and the disc grabbing device 100 can perform a disc grabbing operation and a disc unloading operation as indicated in FIGS. 2A-2D.

Refer to FIG. 1D. Each first lever 131 has a first carrying portion 132 disposed thereon. The first carrying portion 132 is protruded from a partial circumferential surface of the first lever 131, and has a wedge shape. Particularly, the width W and the thickness T of the first carrying portion 132 gradually increase along a partial circumferential surface of the first levers 131 from a tip 133 to form an inclined plane 134. The first lever 131 is such as a round rod. The position of the first carrying portion 132 corresponds to a position between the first disc 11 and the second disc 12 of the grabbed discs 10 counted in a bottom-up manner (as indicated in a partial enlarged view at the right-hand side of FIG. 2A).

When the first lever 131 rotates, the first carrying portion 132 is driven to move between a disc releasing position and a disc holding position. Particularly, when the first carrying portion 132 is in the disc holding position, the first carrying portion 132 is protruded outside the center column 112 and overlaps the inner edges 10D of the center holes of the discs 10 to support the stacked discs 10 (as indicated in a partial enlarged view at the right-hand side of FIG. 2C). When the first carrying portion 132 is in the disc releasing position, the first carrying portion 132 is retrieved in the center column 112 without overlapping the inner edges 10D of the center holes of the discs 10 (as indicated in a partial enlarged view at the right-hand side of FIG. 2B). The first carrying portion 132 and the corresponding first lever 131 can be integrally formed in one piece; or the first carrying portion 132 can be additionally disposed on the corresponding first lever 131. The first lever 131 can be formed of metal or plastics, and can provide sufficient flexibility through the properties of its materials or through its structure, and the present invention is not limited thereto.

Refer to FIG. 1E. Each second lever 141 has a second carrying portion 142 disposed thereon. The second carrying portion 142 is protruded from a partial circumferential surface of the second lever 141, and has a fan shape. The second lever 141 is such as a round rod. The position of the second carrying portion 142 corresponds to the underneath of the first disc 11 of the grabbed discs 10 counted in a bottom-up manner (as indicated in a partial enlarged view at the left-hand side of FIG. 2A). When the second lever 141 rotates, the second carrying portion 142 is driven to move between the disc releasing position and the disc holding position. Particularly, when the second carrying portion 142 is in the disc holding position, the second carrying portion 142 is located at the underneath of the outer edges 10S of the discs and overlaps the outer edges 10S of the discs to support the stacked discs 10 (as indicated in a partial enlarged view at the left-hand side of FIG. 2B). When the second carrying portion 142 is in the disc releasing position, the second carrying portion 142 is at a location without overlapping with the outer edges 10S of the discs (as indicated in a partial enlarged view at the left-hand side of FIG. 2D). The second carrying portion 142 and the corresponding second lever 141 can be integrally formed in one piece; or the second carrying portion 142 can be additionally disposed on the corresponding second lever 141. The second levers 141 can be formed of metal or plastics, and can provide sufficient flexibility through the properties of its materials or through its structure; and the present invention is not limited thereto.

In the present embodiment, when the disc grabbing device 100 wants to unload a single disc 10, said single disc 10 is firstly supported at the second carrying portion 142 of the second lever 141. In the case, the second carrying portion 142 is in the disc holding position. Then, the second lever 141 is rotated to move the second carrying portion 142 to a location without overlapping with the outer edge 10S of the discs and make said single disc 10 to be unloaded. Before the disc 10 is unloaded, the second carrying portion 142 is supported at the outer edge 10S of the discs 10. Thus, when the disc 10 is unloaded, the disc 10 falls stably without wobbling or tilting.

Figure 2A:
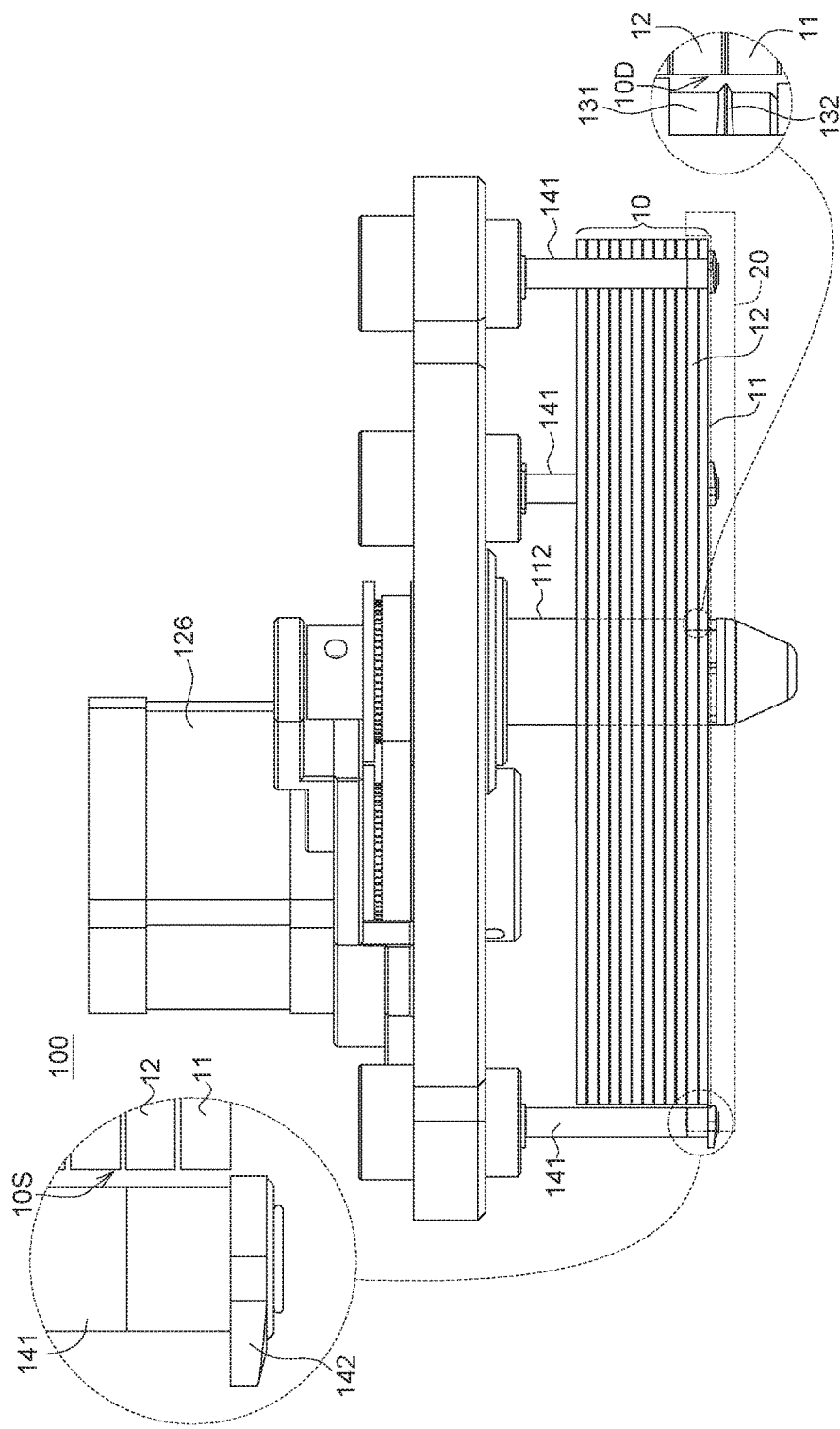
FIG. 2A is a schematic diagram of a disc grabbing device in a first operating state and a partial enlarged view corresponding to a first lever and a second lever.

An operating method of a disc grabbing device 100 is indicated in FIGS. 2A-2D. Firstly, as indicated in FIG. 2A and FIG. 10, multiple discs 10 including the first disc 11 and the second disc 12 counted in a bottom-up manner are placed on a carrying tray 20 of a disc library. When the disc grabbing device 100 intends to grab multiple discs 10, the driver 126 drives the drive shaft 121 and the center gear 124 to respectively rotate the first planetary gears 122 and the second planetary gears 123 synchronically and makes the first levers 131 and the second levers 141 also rotate synchronically, such that the disc grabbing device 100 enters a first operating state. In the first operating state, the first carrying portion 132 and the second carrying portion 142 are located at a disc releasing position respectively. That is, the first carrying portion 132 is located in the center column 112 without overlapping the inner edges 10D of the center holes of the discs, and the second carrying portion 142 does not overlap the outer edges 10S of the discs. Thus, the center column 112 of the disc grabbing device 100 can be inserted into the center holes of multiple discs 10 and prepares to grab multiple discs 10.

Then, as indicated in FIG. 2B and FIG. 1O, the driver 126 further drives the drive shaft 121 and the center gear 124 to respectively rotate the first planetary gears 122 and the second planetary gears 123 synchronically and makes the first levers 131 and the second levers 141 also rotate synchronically, such that the disc grabbing device 100 enters a second operating state. In the second operating state, the first carrying portion 132 is located at the disc releasing position, and the second carrying portion 142 is located at a disc holding position. That is, the first carrying portion 132 does not overlap the inner edges 10O of the center holes of the discs 10, but the second carrying portion 142 overlaps the outer edge 10S of the first disc 11. Thus, the multiple discs 10 lean on the second carrying portions 142 to complete the operation of grabbing the multiple discs 10 by the disc grabbing device 100. Then, the disc grabbing device 100 moves the grabbed multiple discs 10 to a corresponding disc drive 21 and prepares to perform a disc unloading operation.

Figure 2C:
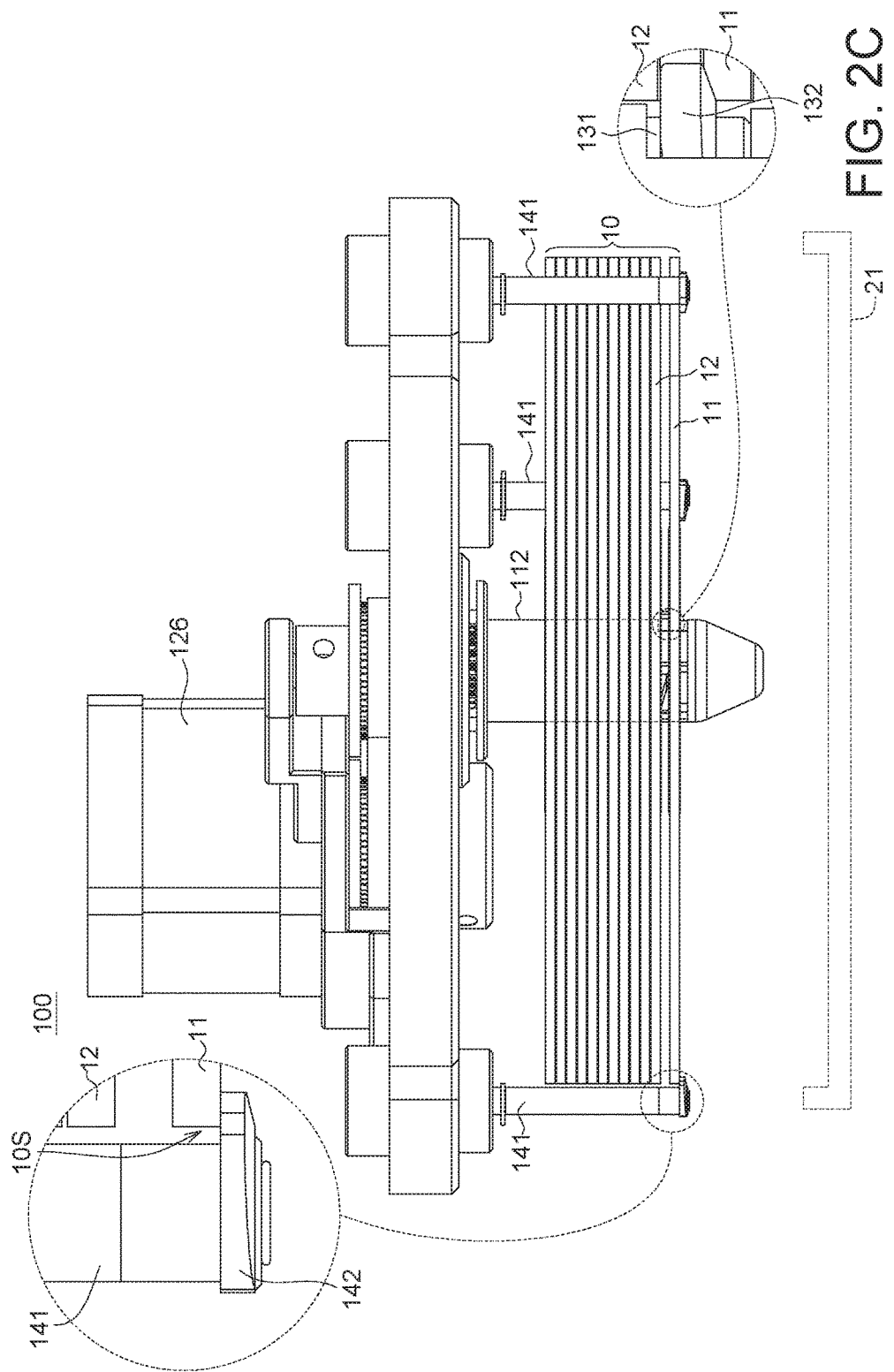
FIG. 2C is a schematic diagram of a disc grabbing device in a third operating state and a partial enlarged view corresponding to a first lever and a second lever.

As indicated in FIG. 2C and FIG. 1C, when the disc grabbing device 100 intends to unload the discs 10, the driver 126 drives the drive shaft 121 and the center gear 124 to respectively rotate the first planetary gears 122 and the second planetary gears 123 synchronically and makes the first levers 131 and the second levers 141 also rotate synchronically, such that the disc grabbing device 100 enters a third operating state. In the third operating state, the first carrying portion 132 and the second carrying portion 142 both are located at the disc holding position. The first carrying portion 132 can be inserted into a space between the first disc 11 and the second disc 12, and the first disc 11 is separated from the second disc 12 by the inclined plane 134 of the first carrying portion 132, and the first carrying portion 132 can provide a support at the underneath of the second disc 12.

That is, in the third operating state, the first disc 11 that needs to be unloaded is supported on the second carrying portion 142, and the second disc 12 and the other discs above the second disc 12 are supported by the first carrying portion 132.

In the present embodiment, the first carrying portion 132 has a conic tip 133 for inserting into a space between the first disc 11 and the second disc 12 and efficiently separating the first disc 11 and the second disc 12. As indicated in FIGS. 1D and 2C, the width W and the thickness T of the first carrying portion 132 gradually increase along a partial circumferential surface of the first lever 131 from the conic tip 133 to form an inclined plane 134. When the conic tip 133 of the first carrying portion 132 is inserted into a space between the first disc 11 and the second disc 12 and the first carrying portion 132 rotates, the gap between the first disc 11 and the second disc 12 relatively increases as the thickness T of the first carrying portion 132 increases, such that the first disc 11 can be separated from the second disc 12.

In the present embodiment, when the discs 10 are stacked one another, if the gap between two discs is not enough or the disc surface does not have ink printed thereon, and the discs are stored in an environment with high temperature and high moisture, electrostatic adsorption will occur and make the discs 10 difficult to be separated from one another. In the disc grabbing device 100 of the present embodiment, the gap between the discs 10 can be increased through the design of the wedge shape of the first carrying portion 132 and make the discs 10 overcome electrostatic adsorption, such that the discs 10 can be efficiently separated from one another and unloaded.

Figure 2D:
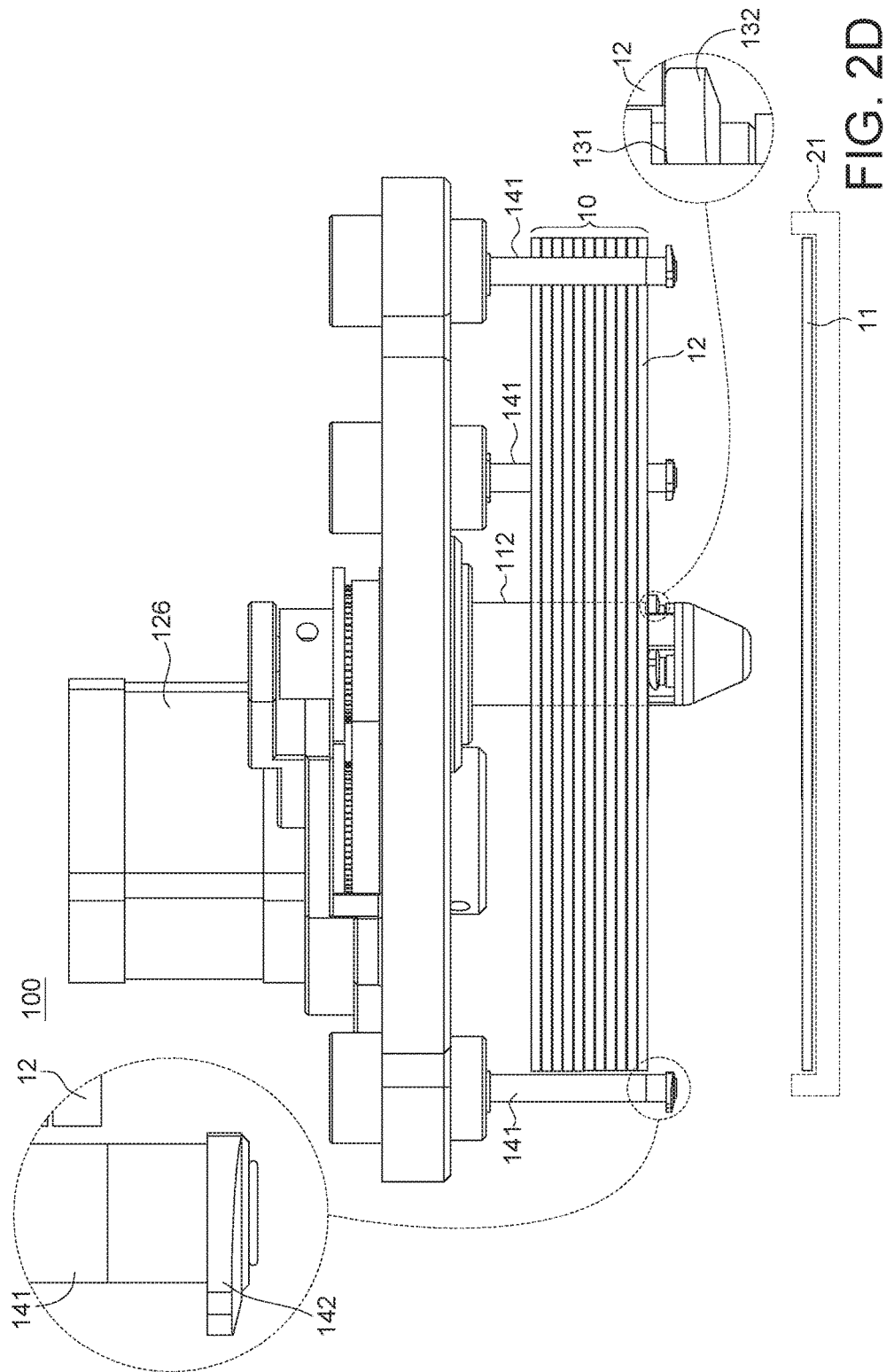
FIG. 2D is a schematic diagram of a disc grabbing device in a fourth operating state and a partial enlarged view corresponding to a first lever and a second lever.

Then, as indicated in FIG. 2D and FIG. 1C, the driver 126 drives the drive shaft 121 and the center gear 124 to respectively rotate the first planetary gears 122 and the second planetary gears 123 synchronically and makes the first levers 131 and the second levers 141 also rotate synchronically, such that the disc grabbing device 100 enters a fourth operating state. In the fourth operating state, the first carrying portion 132 is located at the disc holding position, and the second carrying portion 142 is located at the disc releasing position. That is, the first carrying portion 132 provides a support at the underneath of the second disc 12, and the second carrying portion 142 is at a location without overlapping with the outer edge of the first disc 11. Thus, the disc grabbing device 100 can perform the disc unloading operation. In the fourth operating state, the first disc 11 is not supported at the second carrying portion 142, and can be unloaded to complete the disc unloading operation. Then, the disc grabbing device 100 can move the grabbed multiple discs 10 to the next corresponding disc drive 21 and prepare for the next disc unloading operation.

When the disc grabbing device 100 intends to unload a disc again, the driver 126 drives the drive shaft 121 and the center gear 124 to reversely rotate the first planetary gears 122 and the second planetary gears 123 synchronically and makes the first levers 131 and the second levers 141 also rotate reversely, such that the disc grabbing device 100 returns to the second operating state (refer to FIG. 2B) from the fourth operating state. In the second operating state, the first carrying portion 132 is located at the disc releasing position, and the second carrying portion 142 is located at the disc holding position. Thus, the remaining discs 10 fall and lean on the second carrying portions 142. Then, the driver 126 again drives the drive shaft 121 and the center gear 124 to forwardly rotate the first planetary gears 122 and the second planetary gears 123 synchronically and makes the first levers 131 and the second levers 141 also rotate forwardly, such that the disc grabbing device 100 enters the fourth operating state from the second operating state to complete the next disc unloading operation.

By the same analogy, the steps of FIG. 2B, FIG. 2C and FIG. 2D are repeated to complete the next disc unloading operation. After all of the discs 10 are unloaded, the driver 126 drives the drive shaft 121 and the center gear 124 to reversely rotate the first planetary gears 122 and the second planetary gears 123 synchronically and makes the first levers 131 and the second levers 141 also rotate reversely, such that the disc grabbing device 100 returns to the first operating state (refer to FIG. 2A). Meanwhile, the first carrying portion 132 and the second carrying portion 142 both are located at the disc releasing positions, such that the disc grabbing device 100 can again perform the disc grabbing operation as indicated in FIG. 2A.

According to the disc grabbing device 100 and the operating method thereof disclosed in above embodiments of the present invention, through the design of planetary gears, one single driver can synchronically drive multiple first levers and multiple second levers to grab and then unload discs. In comparison to the conventional design in which the discs are grabbed by a grabbing mechanism disposed only on the center column, the disc grabbing device 100 of the present embodiment has a simplified structure and can grab and unload discs more efficiently and quickly, not only reducing the error rate but further avoiding the discs being scratched or damaged.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A disc grabbing device used for grabbing a plurality of discs and sequentially unloading the plurality of discs, wherein the disc grabbing device comprises:
    a support body comprising a plate and a center column, wherein when the disc grabbing device grabs the plurality of discs, the center column is located in center holes of the plurality of discs;
    a drive shaft rotatably disposed on the plate;
    a plurality of first planetary gears respectively engaged with the drive shaft and connected to a plurality of first levers disposed in the center column for driving the first levers to rotate;
    a center gear rotatably disposed on the plate;
    a plurality of second planetary gears respectively engaged with the center gear and connected to a plurality of second levers for driving the second levers to rotate, wherein the second levers are located outside the plurality of discs; and
    a driver for concurrently driving the drive shaft and the center gear to rotate the first planetary gears and the second planetary gears synchronically and make the first levers and the second levers rotate synchronically.

2. The disc grabbing device according to claim 1, wherein each of the first levers comprises a first carrying portion whose position corresponds to a position between a first disc and a second disc of the plurality of grabbed discs counted from bottom of the plurality of grabbed discs, and each of the second levers comprises a second carrying portion whose position corresponds to underneath of the first disc of the plurality of grabbed discs;
    wherein, the disc grabbing device has a first operating state in which the first carrying portions and the second carrying portions are located at disc releasing positions;
    wherein, the disc grabbing device has a second operating state in which the first carrying portions are located at the disc releasing positions, and the second carrying portions are located at disc holding positions;
    wherein, the disc grabbing device has a third operating state in which the first carrying portions are located at the disc holding positions, and the second carrying portions are located at the disc holding positions;
    wherein, the disc grabbing device has a fourth operating state in which the first carrying portions are located at the disc holding positions, and the second carrying portions are located at the disc releasing positions.

3. The disc grabbing device according to claim 2, wherein when the first carrying portions are located at the disc releasing positions, the first carrying portions are located in the center column; when the first carrying portions are located at the disc holding positions, the first carrying portions are located outside the center column and overlap inner edges of the center holes of the plurality of grabbed discs; when the second carrying portions are located at the disc releasing positions, the second carrying portions are at locations without overlapping with the outer edges of the plurality of grabbed discs; when the second carrying portions are located at the disc holding positions, the second carrying portions are located at underneath and overlap the outer edges of the plurality of grabbed discs.

4. The disc grabbing device according to claim 1, wherein each of the first levers comprises a first carrying portion protruded from a partial circumferential surface of each of the first levers, each first carrying portion has a wedge shape, and a width and a thickness of each first carrying portion gradually increase along a partial circumferential surface of corresponding first lever from a tip to form an inclined plane.

5. The disc grabbing device according to claim 4, wherein when the first carrying portions are located at disc holding positions, each tip of the first carrying portions is inserted into a space between a first disc and a second disc of the plurality of grabbed discs counted from bottom of the plurality of grabbed discs.

6. The disc grabbing device according to claim 1, wherein each of the second levers comprises a second carrying portion protruded from a partial circumferential surface of each of the second levers and has a fan shape.

7. The disc grabbing device according to claim 1, wherein the second planetary gears are disposed near a periphery of the plate.

8. The disc grabbing device according to claim 1, wherein the disc grabbing device further comprises a belt and an active gear engaged with the center gear; the driver, by using the belt and the active gear, respectively drives the drive shaft and the center gear to rotate and make the first planetary gears and the second planetary gears rotate synchronically.

* * * * *